Figure 1:
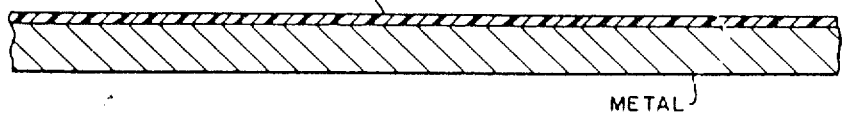

Dec. 3, 1963     C. G. SCHWARZER     3,113,036
COATING COMPOSITIONS
Filed July 7, 1961

INVENTOR:
CARL G. SCHWARZER
BY: Martin S. Baer
HIS ATTORNEY

United States Patent Office 3,113,036
Patented Dec. 3, 1963

3,113,036
COATING COMPOSITIONS
Carl G. Schwarzer, Walnut Creek, Calif., assignor to Shell Oil Company, New York, N.Y., a corporation of Delaware
Filed July 7, 1961, Ser. No. 122,408
15 Claims. (Cl. 117—75)

This invention relates to new and improved coating compositions. More specifically it relates to mixtures of (1) oxirane compounds with (2) mixtures or liquid reaction products of cyclic unsaturated acid anhydrides with certain liquid polymers of diethylenically unsaturated hydrocarbons having conjugated double bonds, to the preparation of such mixtures and to coatings prepared therefrom.

In the description of this invention, the term "polymer" is used to include both homopolymers of diolefinically unsaturated compounds and copolymers of diolefinically unsaturated compounds with various other compounds.

This invention is particularly applicable to liquid copolymers of mesityl oxide with conjugated diethylenically unsaturated hydrocarbons. These products, which were only recently invented, are described in U.S. Patent No. 2,986,580 to P. A. Devlin. The products described in said patent are preferred starting materials for the production of the compositions of this invention. The disclosures of said patent with respect to the preparation and properties of the copolymers of mesityl oxide and diolefinically unsaturated hydrocarbons are incorporated herein by reference.

More broadly, this invention is applicable to certain liquid polymeric compositions of relatively low molecular weight, ranging from about 500 to about 8000, which are the products of the polymerization of a conjugated, diethylenically unsaturated hydrocarbon either alone, or with another similar co-monomer, or with a minor molar proportion of a polymerizable, olefinically unsaturated co-reactant such as limonene, vinylcyclohexane, unsaturated carboxylic acids, unsaturated halides, unsaturated alcohols, unsaturated ethers, or unsaturated carbonyl compounds, or with 2 or more of these or similar co-reactants. The feature which distinguishes all liquid polymers suitable for use in this invention is that at least a substantial proportion of their diolefin units is added in 1,4-configuration. This means that a substantial part of the carbon-carbon double bonds in these polymers are present in the backbone of the polymer chain itself, and not in side groups which branch off from the chain. It will be apparent that the suitability of some of these copolymers may be adversely affected by inclusion of certain co-reactants, e.g., such as cause steric hindrance of access to the internal double bond, and such as provide groups that are independently reactive with anhydride, causing undesired cross-linking.

A particular usefulness of mesityl oxide-diolefin copolymers and similar polymers lies in their ability to be converted into tough, impact resistance films for coating metal. Such films can be obtained by applying the liquid to the metal and baking the resulting compositions. Such films are especially useful for coating sheet metal used in the manufacture of cans for foodstuffs and beverages, i.e., as can liners.

In one special aspect, this invention provides compositions which are superior to those of the prior art as can liners.

The ideal can liner is characterized by the qualities of low cost, pore free uniformity of coating, stability during can forming operations, good adhesion and complete insolubility in aqueous liquids, as well as tastelessness and lack of toxicity. While a variety of resins display many of these properties, it has been found that resins with good physical and chemical properties are expensive while inexpensive resins lack some of the desired physical or chemical properties. It has been the practice in the canning industry to coat cans with a base coat of a relatively inexpensive polymer predominating in hydrocarbon components and apply to this, as a so-called top coat, a thin coating of a vinyl polymer. This assures that any unavoidable pores in the base coat are covered and that the surface which is in contact with the food or beverage is as tasteless and non-reactive as is possible to achieve with available material. Since the vinyl polymer is relatively more expensive, the combination provides the desired thickness of coating with the desired surface properties of the vinyl polymers while maintaining a moderate average cost for the total coating.

In using products such as mesityl oxide-diolefin copolymers of the above mentioned Devlin patent it has been found that such materials provide very satisfactory properties for the base coat of can liners but, because of their predominantly hydrocarbon nature, they cannot be easily bonded with all available types of vinyl polymers which could be used for the top coat. It has been found that, to provide satisfactory can liners, the vinyl polymers which are used with polymers such as those of the Devlin patent must be of the more expensive types of available vinyl polymers. The total cost of the two coats is competitive with other coatings, but it is nevertheless desirable to improve the characteristics of the undercoat to facilitate adhesion of lower priced vinyls, so that good coatings can be provided at still lower total cost. The compositions of this invention provide these desired improved undercoats.

The compositions of this invention are also outstanding in providing baked primer coatings on metals, characterized by excellent chemical resistance, flexibility, aging characteristics, metal wetting and adhesion, recoatability, and excellent electrical resistance. These primers show very good adhesion to top coats of conventional metal surface coatings such as enamels and lacquers.

In another special application, the compositions of this invention provide extremely tough and chemically resistant coatings when applied by a flame-coating technique. These coatings are suitable, for example, for protecting materials such as metal drill pipe and the like, which are exposed to rough usage as well as to corrosive surrounds.

It is, therefore, an object of this invention to provide novel compositions which are suitable for preparing improved coatings for metal surfaces. It is a more specific object to provide novel compositions of matter which consist predominantly of certain polymers of conjugated diolefinically unsaturated hydrocarbons, modified to provide improved adhesion of vinyl polymers to surfaces formed therefrom. It is a further specific object to provide compositions which are suitable for coating metal to be used in the canning of foodstuffs and beverages. It is another specific object to provide compositions which are suitable for baked-on primer coatings of metal objects. Another specific object is to provide compositions which are suitable for application by flame coating to provide extremely tough and resistant coatings on metal exposed to rough usage. Other objects are to provide improved coated metal surfaces of the several types just mentioned. Other objects will be apparent from the following description of the invention.

It has now been found that these and other objects can be accomplished according to this invention by compositions comprising a predominant amount of the reaction product of a polymer of a conjugated diethylenically unsaturated hydrocarbon, such as described hereafter in greater detail, a minor amount of an organic unsaturated cyclic anhydride and a sufficent amount of an epoxide to provide at least one epoxy group per anhydride group. While it is generally preferred that the anhydride be present in the form of a reaction product with the polymer, it may also be used in some applications in the form of a physical admixture without prior reaction. In that case, reaction of anhydride and polymer takes place in situ during the baking of the coating.

In another embodiment this invention consists of improved coated metal surfaces consisting of a metal substrate coated with a baked film prepared by applying one of the compositions of this invention to the metal. In a further embodiment a baked vinyl film adheres as a top coating to the primer coating prepared from one of the compositions of this invention.

FIG. 1 of the drawing illustrates a coated metal surface according to this invention in which the metal is coated with a baked film of a composition based on a diolefin polymer, an organic unsaturated cyclic anhydride, and a poly-vic-epoxide.

Figure 2:
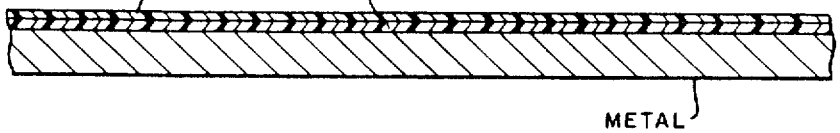

FIG. 2 of the drawing illustrates a metal substrate coated with a baked film of said composition which in turn is coated with a baked film of vinyl resin.

It will be understood that the specified ingredients of the films as illustrated in the drawing are those which are further described in substantial detail in this specification as being effective in compositions of this invention.

THE COMPONENTS OF THE COMPOSITIONS OF THIS INVENTION

The Polymers

The feature which distinguishes the liquid polymers suitable for use in this invention, as stated above, is that a substantial proportion of their diolefinic units is added in 1,4 configuration. Those polymers having a high proportion of 1,4 addition, e.g., 75% or more, lead to best results in that they permit greater ease of forming the desired anhydride addition product and incorporation of larger amounts of anyhdride without formation of generally undesired cloudy reaction products. Useful results are obtained, however, with polymers, having as little as 25%, but preferably at least between 30 and 40% 1,4 addition. The invention is, in general, applicable to liquid polymers having 25% or more 1,4 structure and having average molecular weights in the range from about 500 to about 8000 or somewhat higher.

The proportion of 1,4 addition in polymerization of conjugated olefinically unsaturated compounds is essentially a function of the reaction conditions, including the catalyst employed. These conditions determine the reaction mechanism and the resulting structure. Homopolymers and copolymers suitable for use in this invention result particularly from free-radical mechanisms, such as are found to occur in the presence of free radical generators, e.g. peroxides. Typical conditions for the preparation of such compounds are described in said Devlin patent. Useful liquid diolefinic polymers can also be prepared in ionic reactions catalyzed by Friedel-Crafts type catalysts, such as described in U.S. Patent No. 2,550,695 to Hillyer et al. and in certain alkali metal catalyzed ionic reactions such as described in U.S. Patent No. 2,631,175 to Crouch. The structure of the latter polymers is discussed in "Liquid Polybutadienes," by Crouch et al., Ind. and Eng. Chem., 47, 2091–2095 (1956). Several polymers which are useful in this invention are materials of commerce.

To provide an illustration of polymers used in one preferred embodiment of this invention, the mesityl oxide-diolefin copolymers and their preparation will be briefly described. More complete information concerning them is given in said Devlin patent. The diolefins which may be employed for producing the mesityl oxide-diolefin copolymers are any of the conjugated diolefinic hydrocarbons, but those having no more than 10 carbon atoms are preferred. Most preferred is 1,3-butadiene, and this will generally be referred to in the following description.

In general, the preferred mode of preparing copolymers of mesityl oxide and diolefins consists of dissolving from 1 to 5 parts of diolefin in 10 parts of mesityl oxide and carrying out the polymerization in the liquid phase at temperatures between about 75° C. and 175° C. The reaction may be carried out without polymerization catalyst but is preferably carried out with from about 0.5 to about 40% by weight, based on diolefin, of a free radical generating polymerization catalyst, suitably a peroxide and most preferably di-tert.butyl peroxide.

The mesityl oxide-diolefin copolymers are mobile to viscous, clear, light colored liquids whose molecular weight is preferably between about 500 and about 8,000, and most preferably between 700 and 5,000. Copolymers containing from about 2 to about 35% combined mesityl oxide on a molar basis, and especially those containing from 3 to about 18% are preferred for the preparation of coating compositions.

The copolymers are soluble in aliphatic and aromatic hydrocarbon solvents such as isooctane or benzene, in ketones such as methyl ethyl ketone and in ethers such as ethyl ether.

Aside from the carbonylic content of these copolymers, they contain primarily polydiene structures. Approximately 20% of the butadiene is present as the 1,2 structure and approximately 80% is combined into the resin as the 1,4 addition product. When further characterized stereochemically, the product shows about 20% of the 1,4 addition product to exist in the cis form and about 80% of the 1,4 addition production in the trans form.

The 1,2-addition structure and the 1,4-addition structure of butadiene may be represented graphically as follows:

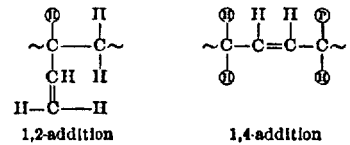

1,2-addition    1,4-addition

In these illustrations, the allylic hydrogen atoms, i.e., those hydrogens attached to a carbon atom which is directly connected to a carbon atom of a carbon-carbon double bond, are shown as ⓗ. The 1,4 structure contains four allylic hydrogens and the 1,2-structure only one. These allylic hydrogens are more reactive than other hydrogens in the molecule. It is believed that the addition of unsaturated anhydride to polymer, according to this invention, takes place predominantly by a direct addition mechanism at one of the allylic hydrogens in the chain as illustrated.

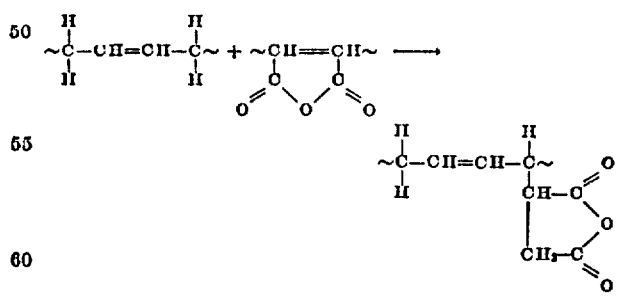

Other similar useful polymers are the copolymers of conjugated diolefins, alpha-beta-ethylenically unsaturated aldehyde, such as acrolein, and mesityl oxide, as described in copending U.S. Serial No. 101,634, of Devlin and Bergman, filed April 10, 1961.

The Anhydrides

For reasons of convenience and suitability it is generally preferred to use maleic anhydride in the practice of this invention. Useful results can also be obtained, however, by using in its place other organic, cyclic unsaturated acid anhydrides, such as tetrahydrophthalic, itaconic, citraconic, aconitic, dimethyl maleic, or dialkyl maleic anhydrides and the like. Anhydrides carrying non-hydrocarbon substituents may be used, as, for example, chloromaleic anhydride, chloroglutaconic anhydride or hydroxyglutaconic anhydride.

The Epoxides

The epoxides to be used in preparing the compositions of this invention comprise those materials, possessing more than one vicinal epoxy, or oxirane, group

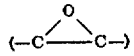

per molecule. Those are preferred which are soluble in the above described polymers or in solutions of such polymers with suitable solvents at atmospheric or moderately elevated temperatures. The polyepoxides may be saturated or unsaturated, aliphatic, cycloaliphatic, aromatic, or heterocyclic and may be substituted with non-interfering substituents such as chlorine, alkoxy groups and the like. They may be monomeric or polymeric.

For clarity, many of the polyepoxides, and particularly those of the polymeric type are described in terms of "epoxy equivalent" values. This expression refers to the average number of epoxy groups contained in the average molecule. The epoxy equivalent value is obtained by dividing the average molecular weight of the polyepoxide by the epoxide equivalent weight. The epoxide equivalent weight is determined by heating a sample of the polyepoxide with an excess of pyridinium chloride dissolved in pyridine and back titrating the excess pyridinium chloride with 0.1 N sodium hydroxide to the phenolphthalein end point. The epoxide value is calculated by considering one HCl as equivalent to one epoxide group. This method is used to obtain epoxide equivalent values referred to herein.

If the polyepoxide material is a single compound having all of the epoxy groups intact, the epoxy equivalent value will be an integer, such as 2, 3, 4, and the like. However, in the case of polymeric polyepoxides the material may contain some of the monomeric epoxide or have some of the epoxy groups hydrated or otherwise reacted and/or contain macromolecules of various molecular weights, so that the epoxy equivalency may be quite low and include fractional values greater than 1.0. Another suitable description of epoxide content of an epoxy compound is in terms of epoxy equivalents per 100 grams.

The monomeric polyepoxide compounds may be exemplified by the following: vinyl cyclohexene dioxide, epoxidized soyabean oil, butadiene dioxide, 1,4-bis(2,3-epoxypropoxy)benzene, 1,3 - bis(2,3-epoxypropoxy)benzene, 4,4'-bis(2,3-epoxypropoxy)diphenyl ether, 1,8-bis(2,3-epoxypropoxy)octane, 1,4-bis(2,3-epoxypropoxy)cyclohexane, 4,4' - bis(2 - hydroxy - 3,4-epoxybutoxy)diphenyldimethylmethane, 1,3 - bis(4,5 - epoxypentoxy)-5-chlorobenzene, 1,4-bis(3,4-epoxybutoxy)-2-chlorocyclohexane, diglycidyl ether, 1,3-bis(2-hydroxy-3,4-epoxybutoxy)benzene, 1,4 - bis(2-hydroxy-4,5-epoxypentoxy)benzene, 1,2,5,6 - di - epoxy-3-hexyne, 1,2,5,6-diepoxyhexane, and 1,2,3,4-tetra(2-hydroxy-3,4-epoxybutoxy)butane.

Other examples of this type include the glycidyl polyethers of the polyhydric phenols obtained by reacting a polyhydric phenol with a great excess, e.g., 4 to 10 mol excess, of a halogen-containing epoxide in an alkaline medium. Thus, polyether A as described in U.S. 2,633,458 to Shokal, which is a concentrate of 2,2-bis(2,3-epoxypropoxyphenyl)propane, is obtained by reacting bis-phenol-A, (2,2-bis(4-hydroxyphenyl)propane) with an excess of epichlorohydrin. Other polyhydric phenols that can be used for this purpose include resorcinal, catechol, hydroquinone, methyl resorcinol, or polynuclear phenols, such as 2,2-bis(4-hydroxyphenyl)butane, 4,4'-dihydrobenzophenone, bis(4-hydroxyphenyl)ethane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane, and the like. Another very suitable group of epoxides comprises epoxidized cyclohexane compounds containing at least two epoxycyclohexyl rings. Typical of these are 3,4-epoxycyclohexylmethyl-3,4-epoxycyclohexane-carboxylate and the corresponding homologs having alkyl substituents in the cyclohexane rings. These and related compounds are described in substantial detail in U.S. Patent 2,890,194 through 2,890,197 and in U.S. 2,917,469.

Another very suitable group of epoxides comprising the polyglycidyl ethers of tetraphenols described in U.S. 2,806,016 to Schwarzer. Typical of these is the polyglycidyl ether of 1,1,2,2-tetrakis(hydroxyphenyl)-ethane described in Example I of said patent, which has a melting point of about 85° C. and contains 0.452 epoxy equivalent per 100 grams. Examples of the polymeric polyepoxides, include the polyepoxypolyhydroxy polyethers obtained by reacting, preferably in an alkaline or an acid medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bisphenol and bis(2,3-epoxy-2-methylpropyl)ether, the reaction product of resorcinal and bis(2,3-epoxypropyl)ether, and the reaction product of catechol and bis(2,3-epoxypropyl)-ether.

A further group of polymeric polyepoxides comprises the hydroxy-substituted polyepoxy polyethers obtained by reacting, preferably in an alkaline medium, a slight excess, e.g., .5 to 3 mol excess, of a halogen-containing epoxide as described above, with any of the aforedescribed polyhydric phenols, such as resorcinol, catechol, bis-phenol, bis(2,2'-dihydroxy-dinaphthyl)methane, and the like.

Also included within this group are the polyepoxy polyethers obtained by reacting, preferably in the presence of an acid-acting compound, such as hydrofluoric acid. one of the aforedescribed halogen-containing epoxides with a polyhydric alcohol, such as glycerol, propylene glycol, ethylene glycol, trimethylene glycol, butylene glycol, and the like, and subsequently treating the resulting product with an alkaline component.

Other polymeric polyepoxide compounds include the polymers and copolymers of the epoxy-containing monomers possessing at least one polymerizable ethylenic linkage. When such monomers are polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, butadiene, vinyl acetate, methacrylonitrile, acrylonitrile, vinyl chloride, vinylidene chloride, methyl acrylate, methyl methacrylate diallyl phthalate, vinyl allyl phthalate, divinyl adipate, chloroallyl acetate, and vinyl methallyl pimelate. Illustrative examples of these polymers include poly(allyl 2,3-epoxypropyl ether), poly(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxy-styrene).

Other particularly suitable polyepoxides include the condensation products of polycarboxylic acids, polycarboxylic acid anhydrides and mixtures thereof with from 1.5 to four times the chemical equivalent amount of a polyepoxide containing more than one vic-epoxy group, the equivalent amount referring to the amount needed to furnish one acid group per epoxy group. The preparation of such compounds and the various starting materials from which they can be prepared are described in U.S. 2,970,983 to Newey. A representative general formula of these compounds, when prepared from dibasic acids, is as follows:

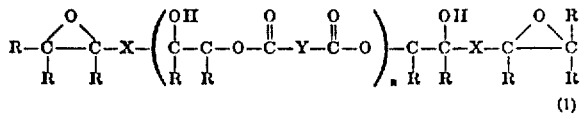

wherein R is hydrogen or hydrocarbon radical, X is organic radical, Y is residue of the dibasic acid and n is an integer and preferably 1 to 10. Particularly preferred are the condensation products of dimer or trimer acids obtained by polymerizing unsaturated fatty acids such as soya bean oil fatty acids and the like with diepoxides of the type of polyether A of said U.S. 2,633,458 to Newey.

A preferred group of epoxy-containing organic materials are the monomeric and polymeric glycidyl polyethers of dihydric phenols obtained by reacting epichlorohydrin with a dihydric phenol in an alkaline medium. The monomeric products of this type may be represented by the general formula

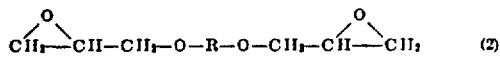

wherein R represents a divalent hydrocarbon radical of the dihydric phenol. The polymeric products will generally not be a single simple molecule but will be a complex mixture of glycidyl polyethers of the general formula

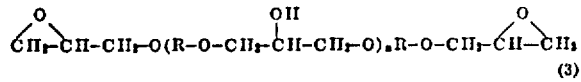

wherein R is a divalent hydrocarbon radical of the dihydric phenol and n is an integer of the series 0, 1, 2, 3 etc. While for any single molecule of the polyether n is an integer, the fact that the obtained polyether is a mixture of compounds causes the determined value for n to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

Preferred polyepoxy derivatives of dihydric phenols are the reaction products of epichlorohydrin and 2,2-bis-(4-hydroxyphenyl)propane. The simplest member of this group is the diglycidyl ether of the phenol, 2,2-bis(2,3-epoxypropoxyphenyl)propane, which is commercially available in the form of liquid concentrates containing from 70% to nearly 100% of the named product. The substantially pure compound has a viscosity of about 40 poises at 25° C., a molecular weight of about 340 and an epoxy value of about 0.59 equivalent per 100 grams, corresponding to an epoxy equivalency of about 2. A typical commercial concentrate of about 70–80% of the compound has a viscosity of about 125 to 175 poises at 25° C., a molecular weight of about 350 (measured ebullioscopically in ethylene dichloride), an epoxy value of about 0.50 equivalent per 100 grams and a corresponding epoxy equivalency of 1.75. It is illustrated as Polyether A in U.S. 2,633,458 to Shokal. Other polyepoxy derivatives of dihydric phenols are those of Formula 3 where R stands for —O—C$_6$H$_4$(C$_3$H$_6$)C$_6$H$_4$—O— and n has average values above zero. For example, products in which the average value of n ranges from 0 to about 4 are useful in this invention. Typical of solid products in this range are those having melting points of about 70° C. and about 98° C., molecular weights of about 900 and about 1400, and epoxide values of about 0.20 and about 0.103 equivalent per 100 grams, respectively. They are illustrated as Polyethers D and E in said Shokal patent.

OPTIONAL COMPONENTS OF THE COMPOSITIONS

Solvents

The compositions of this invention may be prepared to consist only of the three above discussed essential components, i.e., polymers, anhydrides and epoxides. Alternatively, the compositions may also contain substantial amounts of suitable solvents. The use of solvents may be resorted to when the polyepoxide and unsaturated polymer are not mutually soluble, or when it is desired to reduce the viscosity of the composition. Many conventional solvents are suitable for use in this invention, including aromatic or paraffinic hydrocarbons such as toluene, xylene, and high boiling straight run mineral spirits; ketones such as methyl ethyl ketone, methyl isobutyl ketone and 4-methoxy-4-methyl-pentanone-2("Pentoxone"); alcohols such as 2-ethyl hexanol and butanol; organic chlorides such as per-chloroethylene, carbon tetrachloride and chloroform; alcohol-ethers such as diethylene glycol diethyl ether, ethylene glycol monoethyl ether ("Cellosolve"); and ethylene glycol monomethyl ether ("methyl-Cellosolve); ethers such as dioxane and tetrahydrofuran; dimethyl sulfoxide; other non-reactive solvents, preferably boiling above 80–100° C., and suitable combinations of these and other solvents.

Curing Agents

Another group of compounds whose use is optional in the compositions of this invention are curing agents for polyepoxides; these are also known as hardeners or catalysts. The effect of curing agents is to convert a liquid epoxy resin composition into a hard, dry, stable, cross-linked resin structure. A great variety of different curing agents for curing epoxy resins are known. Many curing agents are disclosed for example, in "Epoxy Resins—Their Applications and Technology," by Lee et al., McGraw-Hill Book Co., Inc., 1957, in chapters 3–5. Such agents which are suitable for use in this invention include among others Friedel Crafts metal halides such as aluminum chloride, zinc chloride, ferric chloride or boron trifluoride as well as complexes thereof with glycols, ethers, tert.amines, phenols, ketones, aldehydes, diazonium salts and the like; phosphoric acid and partial esters thereof, including n-butyl orthophosphate, diethyl orthophosphate and hexaethyl tetraphosphate; tertiary amines and amino compounds such as triethylamine, dicyandiamide and melamine; salts of inorganic acid such as zinc fluoborate, potassium persulfate, nickel fluoborate and magnesium perchlorate; salts of organic acids such as stannous octoate and zinc octoate; phenolic compounds, such as phenol, resorcinol, bisphenol-A and the like; amine salts of organic acids such as the 2-ethylhexoic acid salt of diethylene triamine; combinations of metal salts with tertiary amines and the like. Particularly suitable curing agents are quaternary ammonium bases; they facilitate the reaction of maleic and similar anhydrides with the epoxide groups present in the composition.

While most epoxy resin curing agents are suitable for use in compositions of this invention, certain ones which would react with the polymer or anhydride components at room temperatures are to be avoided. Particularly undesirable are primary and secondary amines because their active hydrogens, attached to the nitrogen atom, tend to react with anhydride residues and cause immediate gelation of the resin. The use of organic acid salts or primary or secondary amines, however, is possible.

The desirability of the presence of epoxide curing agents in the compositions of this invention depends mainly on the ratio of polyepoxide to anhydride as will be explained in more detail hereinafter.

Driers

Paint driers are conventional materials of commerce, used in paint compositions and with drying oils. They are generally organic acid salts of certain metals, particularly cobalt, lead and manganese. The organic acid constituents are ordinarily drying oil fatty acids, rosin, naphthenic acids, octanoic acid or the like.

In the compositions of this invention driers are not required when the compositions are to be employed for the production of thin coats, such as can coatings, which are typically less than 1 mil in thickness. On the other hand, when thicker coatings are to be prepared and baked at moderately elevated temperature, e.g., up to 180° C., a drier is desirably incorporated to provide sufficient cure at the preferred conditions. The amount and type of drier employed are those conventionally employed in the paint industry. For example, cobalt compounds are generally employed in concentrations up to about 0.1% cobalt based on the total solids and lead compounds in concentrations of about 0.5% lead, based on total solids.

Fillers and Pigments

A variety of fillers and pigments which are conventionally employed in commercial coating compositions may also be employed in the compositions of this invention. Essentially inert fillers include, for example, asbestos or glass floc. Pigments, some of which are particularly desirable because they also impart additional anticorrosive properties to the coating, include, for example, titanium dioxide, zinc chromate, chromic oxide, lead oxides and zinc oxide. Fillers are generally employed in relatively high proportions, e.g., up to 75% based on the resin composition.

PREPARING THE COMPOSITIONS OF THIS INVENTION

The compositions of this invention may contain maleic or similar acid anhydrides in physical admixture with the liquid components, but preferably contain such anhydride in the form of a reaction product with a suitable polymer.

Physical mixtures of anhydrides with polymer are simply prepared by mixing the appropriate amount of anhydride and heating, with stirring, until the mixture is a homogeneous solution. Heating at temperatures from 160° to 210° C. for up to 60 minutes is generally sufficient. The mixing is preferably carried out in the absence of oxygen and of free radical generators. An inhibitor of generation of free radicals may be added if desired.

The preparation of reaction products of said anhydrides with said polymers is preferably carried out according to the method described in my copending application Serial No. 109,843, filed May 15, 1961. The disclosures of said application with respect to the preparation of reaction mixtures are incorporated herein by reference. Briefly stated, the method involves heating a reaction mixture of polymer and anhydride, optionally in the presence of a solvent, to a temperature in the range from 160° to 250° C., and preferably between 180 and 210° C. The reaction is carried out in the absence of oxygen, for example, the reactor is swept with an inert gas before the reagents are added, an inert gas blanket is maintained during the reaction, and an inhibitor of free radical polymerization is present in the reaction mixture. Numerous inhibitors of this type are known. Typical examples of suitable inhibitors are tert. amyl hydroquinone, hydroquinone, diphenylamine and 2,6-di-tert.butyl-4-methylphenol. The amount of inhibitor of this type usually used is between 0.12 and 5 percent by weight.

The incorporation of polyepoxides into the compositions of this invention requires no special techniques. In those cases in which the polyepoxide is a liquid of adequately low viscosity at ambient temperatures, the epoxide can be added directly to the mixture or reaction product of polymer and anhydride if the mixture or reaction product is also a liquid of adequately low viscosity. Otherwise the liquid epoxide is suitably added to a solution of the mixture or reaction product of polymer and anhydride.

In those cases where the epoxide is a solid at ambient temperature or has a high viscosity, one initially prepares a solution of the epoxide in a suitable solvent and adds this solution to the mixture or reaction product of polymer and anhydride or to a solution of said mixture or reaction product in a suitable solvent.

The solvents used in preparing these solutions have been discussed above. The choice of solvent and of concentration of ingredients is generally dictated by the desired viscosity of the product and this in turn is a function of the method by which it is desired to apply the coating. The selection of suitable solvents, viscosities and methods of application will be readily apparent to persons skilled in the art of preparation of surface coatings. Some specific illustration examples are presented hereinafter.

Mixtures of polyepoxides with polymer and anhydride or with reaction product of polymer and anhydride, either in solution or without solvent, can be prepared and stored for extended periods without significant deterioration. Such mixtures have been stored, for example, at about 50° C. for more than a month without showing signs of reaction, and for several months at about 20°–25° C.

Driers may be added to the compositions of this invention prior to storage without affecting storage stability of the compositions.

When epoxide curing agents are to be used in the coating, they should be added a relatively short time before the coating is to be prepared since after several hours storage they will generally result in some gelling of the mixed composition.

The addition of solid fillers or pigments may be carried out in the conventional equipment and manner in which such materials are added to coating compositions.

PROPORTIONS OF COMPONENTS

Considerable variation is possible in adjusting the proportions of components employed in the compositions of this invention.

The range of concentration of anhydride relative to polymer may vary over a wide range. Concentrations of 0.5% by weight or more may be useful. Generally, amounts of less than 1 percent by weight, based on polymer, are not used if the full advantages of this invention are to be achieved. For most purposes, proportions of 2 to 20% by weight anhydride, based on polymer, are preferred. Concentrations as high as 60% or more may be employed, but ordinarily these require too large a proportion of polyepoxide.

There is a particularly preferred lower limit for the amount of polyepoxide present in the compositions. This lower limit is a function of the amount of anhydride present. It is such as to provide at least one epoxy group for each anhydride molecule or residue of an anhydride molecule in the compositions. Any amount equal to or greater than this ratio can be suitably employed, but it is preferred to maintain the amount of polyepoxide at no more than about 2 to 3 epoxy groups per mole of anhydride.

When solvents are employed in the composition they are usually present in concentrations between 10 and 75% by weight, based on the total solid content of the resin combination, although lower and higher concentrations may be used if desired.

When epoxy curing agents are employed in the compositions they are used in the proportions conventionally used for curing of epoxy resins. Those curing agents which act catalytically, e.g., $BF_3$ and its complexes, or certain tertiary amines such as butyldimethyl amine which facilitate the reaction between an anhydride and an epoxide group, may be present in very small concentrations, e.g., from 1 to 5% by weight, based on the epoxide present. Those curing agents which inter-react on a stoichiometric basis, e.g., organic salts of polyamines, are used in the required stoichiometric amount, based on the excess of epoxy groups over available anhydride groups.

METHOD OF FORMING COATINGS

The liquid compositions of this invention can be converted to thin coatings, such as can coatings, by spreading them on a suitable metal surface in 0.1 to 1 mil thickness and baking them at such temperatures as about 150 to 260° C., particularly about 205° C. for about 5 to 15 minutes.

Thicker films, such as are particularly useful in coatings of industrial equipment including prime coats, are prepared by spreading the liquid compositions including chemical driers on metal surfaces in thicknesses of from 1 to 5 mils and baking at somewhat lower temperatures in the above range, preferably about 170° C. for 30–60 minutes.

Still thicker films, e.g., 5 to 15 mils can be produced by applying the liquid composition without drier in such substantial thickness and baking, for example, at a relatively high temperature, e.g., at 370° C., for 4 to 12 minutes.

In general, baking of coatings is carried out at times from 4 to 60 minutes and temperatures from 120° to 430° C.

The coatings produced by bakes of this type are continuous, flexible, light colored, protective coatings having excellent toughness, chemical and impact resistance. The adhesion to the metal backing in such coatings is superior to that in coatings produced from the copolymers without additional components although the latter also have a substantial adhesion to metal backing which is sufficient for many purposes.

A somewhat different method for applying particularly tough coatings of various thicknesses is the flame curing method which consists in applying the composition to a metal surface in a thickness of from 0.5 to 5.0 mils and subjecting the coated surface to a gas-air flame. Such flames, for example, heat the metal surface to approximately 250 to 550° C. in about 10 seconds.

In preparing coatings from the products of this invention, the coating may be laid down by known methods, such as spraying, brushing or "doctoring." For such methods, the product is dissolved in a suitable solvent, such as described above, to provide a solution which has the requisite viscosity and surface characteristics. Such solutions typically contain from 20 to 50 percent solids for the preparation of coatings of 0.1 to 2 mils thickness. Solution of much higher solids content, e.g., up to 90%, are used for preparation of thick coatings, e.g., up to 15 mils.

In preparing coatings for flame curing, the coating may be brushed or sprayed on and the surface then exposed to a flame, or the coating may be sprayed on through a flame. Multiple flames may be applied if desired.

The following examples further illustrate this invention but are not to be considered a limitation thereof.

EXAMPLE I

A suitable copolymer for use in this invention is prepared by placing mesityl oxide in an autoclave, heating the vessel to 150° C. and adding during a period of several hours a solution of di-tert.butyl peroxide catalyst in mesityl oxide solution, and butadiene, until approximately 30 parts of butadiene and about 1.5 parts of catalyst per 100 parts of total reaction mixture have been added. Reaction is continued for a period of several hours after addition of reactant and cataylist is discontinued. Product is separated from the unreacted ingredients by Claisen distillation at about 2 millimeters at 150° C.

Copolymer produced in this manner typically has the following properties:

Viscosity, Gardner-Holdt _____ Z6 to Z7
Color, Gardner _____ 8
Density, gm./ml _____ 0.913
Molecular weight _____ 2600
Iodine value, gram I/100 g. (Wijs) _____ 450
Carbonyl value, equivalents per 100 g _____ 0.06
Structure:
   Percent carbonyl, as mesityl oxide _____ 7.8
   Percent 1,4 addition of diene _____ 82
   Percent 1,2 addition of diene _____ 18

EXAMPLE II

In the production of another suitable polymer, isoprene is substituted under otherwise equal reaction conditions for the butadiene of Example I. A copolymer of similar properties is produced.

EXAMPLE III

A reaction product of the polymer of Example I with about 2.5% maleic anhydride is prepared as follows: 294 parts of polymer and 1.5 parts of tertiary amyl hydroquinone (in the form of the commercial inhibitor "Sandovar A") are heated in an agitated kettle to 164° C. while being sparged with nitrogen. Nitrogen flow is discontinued, and 8.4 parts of freshly ground maelic anhydride added. The temperature is raised to 190° C. and held there for 65 minutes. During this period, the heterogeneous mixture of maleic anhydride and copolymer turns into a clear solution. A vacuum of 15 mm. mercury, absolute, is then pulled on the kettle and the mixture held at a temperature of 193° C. for 20 minutes to remove unconverted maleic anhydride. The product may then be recovered as is, or a small amount of solvent added to facilitate its removal from the kettle and further handling. Conveniently, the temperature of the product is reduced, 25 parts of methyl isobutyl ketone added, and the product removed for use as desired. The product contains about 2.2 percent maleic anhydride in combined form. The combined maelic anhydride content is determined by extracting unreacted maleic anhyuride from the reaction product by means of hot water and then titrating the aqueous extract to determine the amount of uncombined maleic anhydride.

Similar products are prepared when hydroquinone or diphenylamine or 2,6-di-tert.butyl-4-methylphenol are substituted for the tert.amyl hydroquinone inhibitor.

EXAMPLE IV

A reaction product of the polymer of Example I with about 5% of maleic anhydride is prepared according to Example III. In this preparation, the amount of polymer is 272 parts, tert.amyl hydroquinone 1.3 parts, and maleic anhydride 15.5 parts. Maleic anhydride is added at a temperature of 155° C., the reaction is carried out for 80 minutes at 190° C. and the product vacuum stripped at 180° C. and 16 mm. mercury for 15 minutes. 25 parts of methylisobutyl ketone is added, providing a solution containing 92% solids. The product contains 5.2 percent maleic anhydride in combined form.

EXAMPLE V

A reaction product containing about 10 percent maelic anhydride is prepared according to Example IV by doubling the amount of maleic anhydride in the reaction mixture, conditions remaining otherwise unchanged.

EXAMPLE VI

A reaction product containing about 20 percent of maleic anhydride is prepared according to Example IV by quadrupling the amount of maleic anhydride in the reaction mixture, conditions remaining otherwise unchanged. For convenience, the amount of solvent used in recovering product is increased to 56 parts, providing a solution containing about 80 percent solids.

EXAMPLE VII

A typical can coating type of surface coating is prepared from a commercial solid polyepoxide which is the reaction product of 2,2-bis(4-hydroxyphenyl)propane and epichlorohydrin which has a Durrans' mercury method melting point of about 70° C., an average number molecular weight of about 900 and an epoxide value of about 0.20, and a reaction product prepared according to Example IV, containing about 5% maleic anhydride.

The polyepoxide is dissolved in methyl isobutyl ketone, providing a solution containing 50–70% solids. The reaction product of Example IV is added to this solution. The solids content of the solution consists of 65% wt. copolymer, 5% wt. maleic anhydride (in reacted form) and 30% wt. polyepoxide. This is calculated to provide two epoxide groups for each anhydride group or residue in the reaction product. Additional solvent is added to make a solution containing 25 parts total solids. This is applied to several tinplated steel plates by brushing; the plates are baked at 205° C. for 10–15 minutes, providing films of about 0.2 mil thickness. The coatings are tested after 1 day, 1 week and 1 month and found to have excellent hardness, flexibility, adhesion and impact resistance, resistance to solvents such as xylene and methyl isobutyl ketone, and resistance to embrittlement on aging.

EXAMPLE VIII

Example VII is repeated, except that in place of 30% of the specified polyepoxy ether in the total composition there is substituted 10% of the condensation product of dimer acid with a polyepoxide of the type of Polyether A supra; the condensation product is described in U.S. 2,970,983 to Newey. The resulting coatings are equivalent to those of Example VII except for a slightly lower impact resistance.

EXAMPLE IX

Example VIII is repeated except that the amount of the epoxy ester is increased from 10% to 20%. The resulting coatings are equivalent in their properties to those of Example VII. Compared to Example VII, they are improved in flexibility, formability, impact resistance and resistance to embrittlement on aging.

EXAMPLE X

The composition of Example VII is modified as follows: the reaction product of the polyepoxide used is the condensation product of dimer acid and polyepoxide described in Example VIII, used in 10% wt. concentration; the reaction product of maleic anhydride butadiene-mesityl oxide copolymer is that of Example III, containing 2.5% maleic anhydride. The coating composition is otherwise prepared like that of Example VII, except that it also contains 0.5% wt. of lead in the form of lead naphthenate and 0.05% by weight cobalt as cobalt naphthenate or cobalt octoate. The final solution in toluene-MEK mixture, containing 50% of solids, is applied in greater thickness, i.e. about 0.9 mil. to tin-coated steel plates and the plates are baked at 150° C. for about 30 minutes.

Compared with a coating produced according to Example VIII, the thicker films have a somewhat reduced hardness and an improved impact resistance; they are susceptible to solvent attack during the first few days after they are produced.

A slight further improvement in the quality of films obtained with this composition results from the addition to the compositions of 2.5% butyl hydrogen phosphate. The resulting films have a somewhat further improvement in impact resistance and in solvent resistance during the first few days following preparation.

EXAMPLE XI

A composition suitable for preparing coatings of intermediate thickness, i.e. about 0.9 mil. is prepared from the polymer-maleic anhydride reaction product of Example III, containing 2.6% maleic anhydride, and a polyepoxide resin which is a commercial liquid concentrate of the diglycidyl ether of bisphenol A containing 70 to 80% of the diglycidyl ether (Polyether A, supra). The final composition contains 94% of the copolymer-maleic anhydride reaction product and 6% of the diglycidyl ether, the whole in a solution of 50% of solids in xylene. The solution also contains 0.5% weight of lead as lead naphthenate and 0.05% wt. cobalt as cobalt naphthenate or cobalt octoate.

The resulting composition, applied in 0.9 mil thickness and baked as in Example X, results in films having very good coating characteristics. Compared to those of Example X they have improved solvent resistance in the early days after formation and a somewhat reduced impact strength after about one month of storage.

EXAMPLE XII

A coating composition is prepared as in Example VII and a second composition is prepared, containing in place of 30% of the specified polyepoxy ether only 15% thereof.

Thin films of about .2 to .3 mil thickness are produced from each of these compositions and baked at a temperature of 204° C. for 15 minutes.

Both sets of coatings have satisfactory impact resistance and excellent hardness, flexibility, adhesion and resistance to solvents, such as aromatics and ketones. When tested after 1 hour overbake at 204° C., it is found that the sample containing 15% epoxy resin has good impact properties after this overbake and the sample containing 30% epoxy resin has still better impact properties.

When tested after oven aging for 3 days at 100° C., the impact properties of the 15% epoxy sample are again good and those of the 30% epoxy sample still better.

EXAMPLE XIII

A modified version of the 15% epoxy resin composition of Example XII is prepared in which the content of maleic anhydride is 2.5% instead of 5%. On the same tests comparably good results are obtained.

EXAMPLE XIV

Compositions are prepared from a copolymer prepared according to Example VII, containing 5% maleic anhydride and as the epoxide 3,4-epoxy-6-methyl-cyclohexylmethyl - 3,4 - epoxy-6-methylcyclohexane carboxylate. One sample is prepared to contain 7% of the epoxide, sufficient to provide one epoxy group per maleic anhydride and the other 14% of epoxide, i.e. sufficient to provide two epoxy groups per maleic anhydride.

The coatings are applied in thick films, i.e. about 5 mils thickness, baked at 370° C. for 7 minutes and tested for a variety of properties.

The samples are found to have excellent adhesion, mar resistance, boiling water resistance, hardness and chemical resistance and good solvent resistance.

In a standard test of chemical resistance the samples withstood exposure for one month to liquid 5% and 15% aqueous nitric acid, 5% and 20% aqueous sulfuric acid, 5% aqueous and glacial acetic acid, and 3% and 20% aqueous sodium hydroxide.

EXAMPLE XV

Similarly to Example XIV, thick films are prepared and tested in which the epoxide is a commercial 70 to 80% concentrate of diglycidyl ether of p,p'-bisphenol A. Equally good results are obtained.

EXAMPLE XVI

Example XIV is repeated with the difference that the epoxide used is the same as that of Example VII. Equally good results are obtained.

EXAMPLE XVII

Example XIV is repeated with the substitution of polyglycidyl ether of 1,1,2,2,tetrakis(hydroxyphenyl)ethane, as described in Example I of U S. 2,806,016 to Schwarzer, for the polyepoxide of Example XIV. Equally good results are obtained with samples containing 4–10% of the epoxide.

EXAMPLE XVIII

Films are prepared in a manner similar to Example XIV, except that for the polyepoxide thereof there are substituted equal stoichiometric amounts of a novolac polyglycidyl ether, i.e. polyglycidyl ether of the acid catalyzed phenol formaldehyde condensation product. Equally good results are obtained.

EXAMPLES XIX–XXIII

Examples XIV–XVIII are repeated with identical formulations and procedures except that in each instance there is added to the composition 0.3% of stannous octoate. The added stannous octoate seems to act mainly as a surfactant, resulting in improved wetting of metals by the compositions and in a generally smoother glossier surface of the resulting compositions. The chemical resistance and other performance properties are substantially improved by the addition.

EXAMPLE XXIV

The compositions of Example XII are repeated with the addition, in each case, of 50% chromic oxide ($C_2O_3$) and 1% stannous octoate to the liquid composition. The compositions are applied as films in 5.5 to 6 mils thickness and are baked at a high temperature, i.e. 370° C. for 6 minutes.

Excellent coating properties are observed in the baked films.

EXAMPLE XXV

Flame coatings of compositions according to this invention are applied to pipe as follows:

Compositions prepared according to Example VII in several different solvents, e.g., methylethyl ketone, methyl isobutyl ketone, and xylene, are prepared to have a Gardner viscosity of P.

The apparatus for applying the coating consists of a conventional paint spray gun using air as a dispersing medium, mounted between two air-gas burner heads on a lathe which rotates the pipe and moves a burner assembly along the pipe at a rate of about two and one half feet per minute. The spray gun is adjusted to deliver a one and one half to three mil thick baked coating per pass. Coatings may be applied in mutiple passes to provide thicknesses from as little as one and one half mil to as much as eighteen mils or more as desired.

Coatings laid down on 3 inch steel pipe from the above described solutions are found to be tough, hard, clear, light colored coatings with excellent water resistance and chemical resistance. The coated pipes prepared in this manner are suitable for use under conditions of rough usage.

The baked coatings can be modified in any of the previously described ways by utilization of different ingredients including various fillers. In a particularly useful modification, there is added to the liquid coating composition an aluminum leaf paste in the concentration of one and one half pounds of paste per gallon of liquid composition. When the aluminum-filled coating composition is sprayed on, a pipe of aluminized apearance is obtained which has improved weather resistance.

When the copolymer of Example II is substituted for that of Example I in the preparation of the maleic anhydride reaction products of Examples III–VI, and the resulting products substituted in Examples VII–XXIV, similar coatings are produced.

When equal weights of citraconic anhydride, dimethylmaleic anhydride and chloroglutaconic anhydride, respectively, are substituted for the maleic anhydride and the resulting products substituted in Examples VII–XXIV, similar coatings are produced.

Numerous other modifications of the illustrated compositions and methods of application may be made within the scope of this invention as described hereinbefore and these will be readily apparent to the person skilled in the art of preparing surface coatings. Thus, the applications of top coats of vinyl resins, enamels, lacquers and the like to appropriate coatings of this invention is conventional and need not be described. The resulting products, however, are generally superior to those heretofore known.

I claim as my invention:

1. A homogeneous liquid composition of matter consisting essentially of (1) a liquid polymer of a conjugated diethylenically unsaturated hydrocarbon, having a molecular weight between about 700 and 5,000 and having over 25% of its diolefinic units added in 1,4-configuration, (2) from 0.1 to 60% by weight, based on said polymer, of an organic unsaturated cyclic acid anhydride, and (3) an oxirane compound having an epoxy equivalent value greater than 1, present in an amount sufficient to provide 1–3 oxirane groups per anhydride molecule.

2. A coated metal surface, consisting of a metal substrate and a coating tightly adhering thereto, said coating consisting of a baked film of the composition of claim 1.

3. A coated metal surface, consisting of a metal substrate, a first coating tightly adhering thereto and a second coating tightly adhering to said first coating, said first coating consisting of a baked film of the composition of claim 1 and said second coating consisting of a baked film of a vinyl resin coating material.

4. A method for preparing coated metal surfaces which comprises applying to the surface a liquid film of a composition according to claim 1 in a thickness from about 0.2 to 15 mils, and baking said film on said surface for a time in the range from 4 to 60 minutes at a temperature in the range from 120° to 430° C.

5. A homogeneous liquid composition of matter consisting essentially of (1) a liquid polymer of a conjugated diethylenically unsaturated hydrocarbon, having a molecular weight between about 700 and 5,000 and having over 25% of its diolefinic units added in 1,4-configuration, (2) from 0.1 to 60% by weight, based on said polymer, of an organic unsaturated cyclic acid anhydride, (3) an oxirane compound having an epoxy equivalent value greater than 1, present in an amount sufficient to provide 1–3 oxirane groups per anhydride molecule, and (4) a non-reactive organic solvent.

6. A composition of matter according to claim 5 wherein said solvent boils above 80° C. and is present in a concentration in the range from 10 to 75% by weight, based on the total of components (1), (2) and (3).

7. A composition of matter according to claim 5 in which said liquid polymer is a copolymer of mesityl oxide and a conjugated, diethylenically unsaturated hydrocarbon, containing from about 2 to about 35 mol percent mesityl oxide.

8. A composition of matter according to claim 7 in which said unsaturated hydrocarbon is butadiene.

9. A composition of matter according to claim 5 in which said anhydride is maleic anhydride, present in a concentration from 1 to 20% by weight, based on polymer.

10. A composition of matter according to claim 5 in which said oxirane compound is a reaction product of epichlorohydrin and 2,2-bis(4-hydroxyphenyl)propane, having a molecular weight between 340 and 1400.

11. A homogeneous liquid composition of matter consisting essentially of a (1) a liquid copolymer of mesityl oxide and a conjugated diethylenically unsaturated hydrocarbon, having a molecular weight between about 700 and 5,000 and containing from 2–30 mol percent combined mesityl oxide, (2) from 1 to 20% by weight, based on said copolymer, of maleic anhydride, and (3) an oxirane compound which is the reaction product of epichlorohydrin and 2,2-bis(4-hydroxyphenyl)propane, having a molecular weight between 340 and about 1400 and being present in an amount sufficient to provide 1–3 oxirane groups per anhydride molecule.

12. A coated metal surface, consisting of a metal substrate, a first coating tightly adhering thereto and a second coating tightly adhering to said first coating, said first coating consisting of a baked film of the composition of claim 11 and said second coating consisting of a baked film of vinyl resin coating material.

13. A homogeneous liquid composition of matter consisting essentially of (1) a liquid copolymer of mesityl oxide and butadiene containing from about 2 to about 35 mol percent mesityl oxide, having a molecular weight between about 700 and 5,000 and having over 25% of its diolefinic units added in 1,4 configuration, (2) from 1 to 20% by weight, based on said copolymer, of maleic anhydride, and (3) the reaction product of epichlorohydrin and 2,2-bis(4-hydroxyphenyl)propane, having a molecular weight between 340 and 1400, present in an amount sufficient to provide from 1 to 3 oxirane groups per molecule of maleic anhydride.

14. A homogeneous liquid composition of matter consisting essentially of (1) a liquid copolymer of mesityl oxide and a conjugated diethylenically unsaturated hydrocarbon, having a molecular weight between about 700 and 5,000 and containing 2–30 mol percent combined mesityl oxide, (2) from 1 to 20% by weight, based on said copolymer, of maleic anhydride, (3) an oxirane compound which is the reaction product of epichlorohydrin and 2,2-bis(4-hydroxyphenyl)propane, having a molecular weight between 340 and about 1400 and being present in an amount sufficient to provide 1–3 oxirane groups per anhydride molecule, and (4) a non-reactive organic solvent.

15. A homogeneous liquid composition of matter consisting essentially of (1) a liquid copolymer of mesityl oxide and butadiene containing from about 2 to about 35% mol mesityl oxide, having a molecular weight between about 700 and 5,000 and having over 25% of its diolefinic units added in 1,4 configuration, (2) from 1 to 20% by weight, based on said copolymer, of maleic anhydride, (3) the reaction product of epichlorohydrin and 2,2-bis(4-hydroxyphenyl)propane, having a molecular weight between 340 and 1400, present in an amount sufficient to provide from 1 to 3 oxirane groups per molecule of maleic anhydride, and (4) a non-reactive organic solvent.

References Cited in the file of this patent

UNITED STATES PATENTS

| | | |
|---|---|---|
| 2,890,204 | Delmonte | June 9, 1959 |
| 2,891,876 | Brown et al. | June 23, 1959 |
| 2,986,580 | Devlin | May 30, 1961 |